United States Patent
Xu et al.

(10) Patent No.: US 11,307,025 B2
(45) Date of Patent: Apr. 19, 2022

(54) DEVICE AND METHOD FOR DETECTING ANGLE OF SHEARER ROCKER ARM BASED ON OPTICAL FIBER SENSING

(71) Applicant: CHINA UNIVERSITY OF MINING AND TECHNOLOGY, Xuzhou (CN)

(72) Inventors: Shaoyi Xu, Xuzhou (CN); Zhencai Zhu, Xuzhou (CN); Wei Li, Xuzhou (CN); Fangfang Xing, Xuzhou (CN); Yuqiao Wang, Xuzhou (CN); Hongyu Xue, Xuzhou (CN); Qiang Peng, Xuzhou (CN); Guang Chen, Xuzhou (CN); Feng Dong, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 17/422,040

(22) PCT Filed: Jul. 7, 2020

(86) PCT No.: PCT/CN2020/100619
§ 371 (c)(1),
(2) Date: Jul. 9, 2021

(87) PCT Pub. No.: WO2021/217877
PCT Pub. Date: Nov. 4, 2021

(65) Prior Publication Data
US 2022/0042793 A1    Feb. 10, 2022

(30) Foreign Application Priority Data
Apr. 26, 2020 (CN) .......................... 202010337685.4

(51) Int. Cl.
*G01B 11/26* (2006.01)
*G01B 21/22* (2006.01)

(52) U.S. Cl.
CPC .............. *G01B 11/26* (2013.01); *G01B 21/22* (2013.01)

(58) Field of Classification Search
None
See application file for complete search history.

(56) References Cited

U.S. PATENT DOCUMENTS

| 4,746,216 A | * | 5/1988 | Sommargren | ......... G01B 11/26 356/485 |
| 2003/0071995 A1 | * | 4/2003 | Kurata | .................. G02F 1/1309 356/364 |

(Continued)

FOREIGN PATENT DOCUMENTS

| CN | 204140070 U | 2/2015 |
| CN | 105530399 A | 4/2016 |

(Continued)

OTHER PUBLICATIONS

International Search Report issued in corresponding International Application No. PCT/CN2020/100619; dated Jan. 29, 2021 China National Intellectual Administration, Beijing, China, 5 pgs.

(Continued)

*Primary Examiner* — Shawn Decenzo
(74) *Attorney, Agent, or Firm* — Hauptman Ham, LLP

(57) ABSTRACT

A device and method for detecting an angle of a shearer rocker arm based on optical fiber sensing. The device includes an optical system and a mechanical system. The optical system includes a broadband light source, a polarizer, collimating lenses, a gradient-rotation media plate, a polarization beam splitter, and a data processing module. The mechanical system includes a connecting base, connecting rods, a slider, a bracket, and a sensor housing. When the shearer operates, the rocker arm converts rotation angle information to linear displacement related to a gradient refractive index by using a connecting rod mechanism, and (Continued)

a position on the gradient-rotation media plate through which linearly polarized light produced by the optical system passes also changes. Due to an optical rotation effect, corresponding rotation angles of a plane of polarization that are formed after the light passing through the gradient-rotation media plate also vary.

9 Claims, 1 Drawing Sheet

(56) References Cited

U.S. PATENT DOCUMENTS

| | | | |
|---|---|---|---|
| 2005/0007605 A1* | 1/2005 | Ivarsson | G01B 11/0625 356/630 |
| 2005/0122514 A1* | 6/2005 | Jang | G01B 11/0641 356/365 |
| 2009/0222206 A1* | 9/2009 | Burns | G01B 5/0023 702/1 |
| 2010/0128267 A1* | 5/2010 | Vose | G01N 21/41 356/364 |
| 2015/0107381 A1* | 4/2015 | Menard | G01D 11/30 73/866.5 |
| 2020/0131950 A1* | 4/2020 | Merriam | F01L 1/20 |

FOREIGN PATENT DOCUMENTS

| | | |
|---|---|---|
| CN | 206291886 U | 6/2017 |
| CN | 109916295 A | 6/2019 |
| DE | 102012021971 A1 | 5/2014 |

OTHER PUBLICATIONS

Written Opinion issued in corresponding International Application No. PCT/CN2020/100619; dated Jan. 29, 2021 China National Intellectual Administration, Beijing, China, 8 pgs.

* cited by examiner

DEVICE AND METHOD FOR DETECTING ANGLE OF SHEARER ROCKER ARM BASED ON OPTICAL FIBER SENSING

RELATED APPLICATIONS

The present application is a US National Phase of International Application Number PCT/CN2020/100619 filed Jul. 7, 2020 and claims priority to Chinese Application Number 2020103376854 filed Apr. 26, 2020.

BACKGROUND OF THE INVENTION

Field of the Invention

The present invention relates to the field of coal mine machinery technologies, and in particular, to a device and method for detecting an angle of a shearer rocker arm based on optical fiber sensing.

Description of Related Art

A shearer, as one of the key apparatuses at the fully-mechanized mining face, is an important technical device to realize efficient and intensive coal mining and improve the working conditions at the working face. The automation control of the shearer has become the key to realize the automation control of the whole working face. However, so far, there is still no perfect solution to overcome the bottleneck technology, namely, automatic drum height adjustment and its related key techniques, to realize the automation control of the shearer.

There are two mainstream manners of automatic height adjustment for the shearer at present: In the first manner, height adjustment is implemented by using a hydraulic control system according to data obtained after measurement of an angle of swing of a rocker arm; and in the second manner, the drum height is directly measured by using a displacement sensor, thus realizing accurate control of the height adjustment.

The disclosed Chinese invention patent (application No. 201910200848.1) puts forwards a sensor and method for detecting an angle of a shearer rocker arm, where the sensor includes a base, a base top cover, a rocking bar, and other structures. The sensor base is mounted at a hinge pin to which the rocker arm is connected on a machine body and the rocking bar is connected onto the rocker arm. When the rocker arm rotates about the hinge pin, the rocking bar synchronously swings about a rotation shaft on the mounting base. A round magnetic steel is mounted on the rotation shaft and produces a rotating magnetic field as the rotation shaft rotates, and then an angle of swing of the rocker arm can be obtained by using an angle sensor based on giant magnetoresistance that is mounted on the base top cover and a circuit structure. However, such a method has the following shortcomings: First, during mounting of the sensor, the rotation shaft of the sensor requires accurate alignment with the center of the hinge pin on the rocker arm. If there is an error in alignment, an angular contact ball bearing on the rotation shaft may produce a great stress when the rocking bar swings with the rocker arm, easily damaging the sensor. Secondly, because the sensor uses a circuit structure, it is required to consider explosion proof and suppression when the machine operates underground. Thirdly, a 120° sector-shaped groove for the rocking bar to pass through is provided in a sidewall of the base top cover of the sensor, and the rocking bar can move in the groove when driven by the shearer rocker arm. Therefore, in adverse working conditions in a mine, dust easily goes into the sensor to affect the lubrication of the bearing and other mechanisms, shortening the service life of the sensor.

SUMMARY OF THE INVENTION

Technical Problem

Invention objective: In view of the foregoing problems in the prior art, the present invention provides a device and method for detecting an angle of a shearer rocker arm based on optical fiber sensing, where the device has a strong anti-electromagnetic interference capability, an intrinsic explosion-proof property, and high precision, thus realizing measurement of the angle of the shearer rocker arm.

Technical Solution

To achieve the objectives of the present invention, the present invention adopts the following technical solutions: A device for detecting an angle of a shearer rocker arm based on optical fiber sensing is provided, which includes an optical system and a mechanical system, where the optical system includes a broadband light source (1), a polarizer (2), a first collimating lens (3), a gradient-rotation media plate (4), a second collimating lens (5), a polarization beam splitter (6), and a data processing module (7); and the mechanical system includes a connecting base (8), a first connecting rod (9), a second connecting rod (10), a slider (11), a bracket (12), and a sensor housing (13).

The broadband light source (1) is connected to the polarizer (2) via a single-mode optical fiber, and the polarizer (2) is connected to the collimating lens (3) via a rotary high birefringence photonic crystal fiber (Hi-Bi PCF). The first collimating lens (3) and the second collimating lens (5) have the central axes on the same line, and both are fixed to the slider (11) via a rigid connecting rod. The slider (11) fits into the bracket (12) via a linear sliding chute on the bracket (12), and the bracket (12) is fixed inside the sensor housing (13).

The gradient-rotation media plate (4) is fixed in the sensor housing (13) and located between the first and second collimating lenses (3) and (5). The second collimating lens (5) is connected to the polarization beam splitter (6) via a rotary Hi-Bi PCF; and the polarization beam splitter (6) is connected to the data processing module (7) via a single-mode optical fiber.

One end of the first connecting rod (9) is connected to the connecting base (8) via a hinge, and the first connecting rod (9) and the connecting base can be rotated with respect to each other via the hinge. The other end of the first connecting rod (9) is connected to the second connecting rod (10) via a hinge, and the first connecting rod (9) and the second connecting rod (10) can be rotated with respect to each other via the hinge. The other end of the second connecting rod (10) is fixedly connected to the slider (11), and the second connecting rod (10) is parallel to a length direction of the bracket (12).

Further, the broadband light source (1) requires explosion-proof treatment.

Further, the gradient-rotation media plate (4) is elongated, has a refractive index gradually varying along the length direction, and further has an optical activity. A specific rotation of the gradient-rotation media plate (4) along the length direction and a position on the length direction meet a linear relationship: $\alpha = kx$, where $\alpha$ is a specific rotation of a certain position on the length direction of the gradient-rotation media plate (4), x is a distance from the certain position on the gradient-rotation media plate (4) to a right end, and k is a constant.

Further, a tail fiber of the polarization beam splitter (6) is a polarization-maintaining optical fiber.

Further, the data processing module (7) is composed of a photoelectric detector, a data processing chip, and a display device; and is used to obtain a phase angle of polarized light by calculation of optical power and display the phase angle with the display device.

Further, the second connecting rod (10) is greater than the gradient-rotation media plate (4) in length.

Further, the slider (11) fits into the sliding chute of the bracket (12) by means of grease lubrication.

The present invention further provides a method for detecting an angle of a shearer rocker arm based on optical fiber sensing, which includes the following steps:

A: fixedly connecting the connecting base (8) of the device to a rocker arm (14) of a shearer by using bolts; fixedly connecting the sensor housing (13) to a machine body of the shearer by using bolts, where an eccentric distance between the hinge pin (15) and the second connecting rod (10) is ensured to be 0; and placing the slider (11) at the rightmost initial position on the sliding chute of the bracket (12);

B: turning on the broadband light source (1); light output from the broadband light source (1) entering the polarizer (2) through a single-mode optical fiber to form linearly polarized light in the polarizer (2), and the linearly polarized light output from the polarizer (2) entering the first collimating lens (3) via a rotary Hi-Bi PCF; the linearly polarized light output from the first collimating lens (3) passing through the gradient-rotation media plate (4) and then reaching the second collimating lens (5), where due to an optical rotation effect, a plane of polarization of the linearly polarized light produces a rotation angle during passing through the gradient-rotation media plate; the linearly polarized light output from the second collimating lens (5) entering the polarization beam splitter (6) via a rotary Hi-Bi PCF; splitting, by the polarization beam splitter (6), the linearly polarized light into two optical components in orthogonal directions, and inputting the optical components to the data processing module (7) via a single-mode optical fiber; and analyzing, by the data processing module (7), an optical signal to obtain a phase angle of the linearly polarized light, where the phase angle $\varphi=\alpha d=kxd$, x being a distance from a certain position on the gradient-rotation media plate (4) to the right end, d being the thickness of the gradient-rotation media plate, and k being a constant;

C: connecting the rocker arm of the shearer to a traction case of the shearer by using a hinge pin; when the shearer operates, the rocker arm (14) of the shearer swinging with the hinge pin (15) as a rotation axis to perform coal mining, and the slider (11) moving leftwards along a straight line with respect to the gradient-rotation media plate (4) during lifting and swinging of the rocker arm (14), where when the rocker arm (14) of the shearer is rotated about the hinge pin (15) from a position 14a to a position 14b, a rotation angle of the rocker arm (14) in this case is $\Delta\alpha$, and simultaneously, the first connecting rod (9) shifts from a position 9a to a position 9b and the second connecting rod (10) moves from a position 10a to a position 10b; and because the second connecting rod (10) is fixedly connected to the slider (11), the slider (11) moves from a position 11a to a position 11b, and in this case, the slider (11) has a displacement of x; and the displacement x of the slider (11) and the angle $\Delta\alpha$ of swing of the rocker arm (14) meet the following relationship:

$$x = \left[l_1\cos\arcsin\frac{l_2\sin(\alpha_0-\Delta\alpha)}{l_1} - l_2\cos(\alpha_0-\Delta\alpha)\right] - \left[l_1\cos\arcsin\frac{l_2\sin\alpha_0}{l_1} - l_2\cos\alpha_0\right]$$

where x is a distance from a position of the slider (11) to the rightmost initial position on the sliding chute of the bracket (12), $l_1$ is the length of the first connecting rod (9), $l_2$ is a distance from the center of a position of the connecting base (8) on the rocker arm (14) to the hinge pin (15), $\alpha_0$ is an included angle between a direction vector of a line where a central axis of an initial position of the rocker arm (14) is located and a direction vector of a line where a length direction of the second connecting rod (10) is located, and $\Delta\alpha$ is an angle of swing of the rocker arm (14), which is positive in a clockwise swing and negative in a counter-clockwise swing; and D: the first collimating lens (3) and the second collimating lens (5) moving with the slider (11) in a straight line along the length direction of the second connecting rod (10), where a position on the gradient-rotation media plate (4) through which the linearly polarized light output from the first collimating lens (3) passes changes accordingly and the rotation angle of the plane of polarization of the linearly polarized light after passing through the gradient-rotation media plate also changes; therefore, a functional relationship between the phase angles $\varphi$ obtained by the data processing module (7) and corresponding to different positions of the slider (12) and the angles $\Delta\alpha$ of swing of the rocker arm (15) is as follows:

$$\varphi = kd \cdot \left\{\left[l_1\cos\arcsin\frac{l_2\sin(\alpha_0-\Delta\alpha)}{l_1} - l_2\cos(\alpha_0-\Delta\alpha)\right] - \left[l_1\cos\arcsin\frac{l_2\sin\alpha_0}{l_1} - l_2\cos\alpha_0\right]\right\};$$

and therefore, the phase angles $\varphi$ and the angles $\Delta\alpha$ of swing meet one-to-one correspondence, that is, the angle of swing of the rocker arm can be determined according to the obtained phase angle of the linearly polarized light.

Advantageous Effect

Compared to the prior art, the technical solutions of the present invention have the following advantageous technical effects:

In the device and method for detecting an angle of a shearer rocker arm based on optical fiber sensing in the present invention, a swing of the rocker arm is converted to movement of a slider by using a slider-crank mechanism, and a displacement is measured according to that linearly polarized light passes through different positions on a gradient-index medium. Based on this ingenious conception, movement displacement is measured by means of optical fiber sensing to realize detection of a rotation angle of the rocker arm. The device of the present invention has such advantages as a strong anti-electromagnetic interference capability, a simple structure, high measurement precision, and an intrinsic explosion-proof property.

Meanings of numerals: 1. Broadband light source, 2. Polarizer, 3. First collimating lens, 4. gradient-rotation media plate, 5. Second collimating lens, 6. Polarization beam splitter, 7. data processing module, 8. Connecting base, 9. First connecting rod, 10. Second connecting rod, 11. Slider, 12. Bracket, 13. Sensor housing, 14. Rocker arm, 15. Hinge pin.

DETAILED DESCRIPTION OF THE INVENTION

The technical solutions of the present invention are further described below with reference to the accompanying drawings and specific embodiments.

Figure 1:
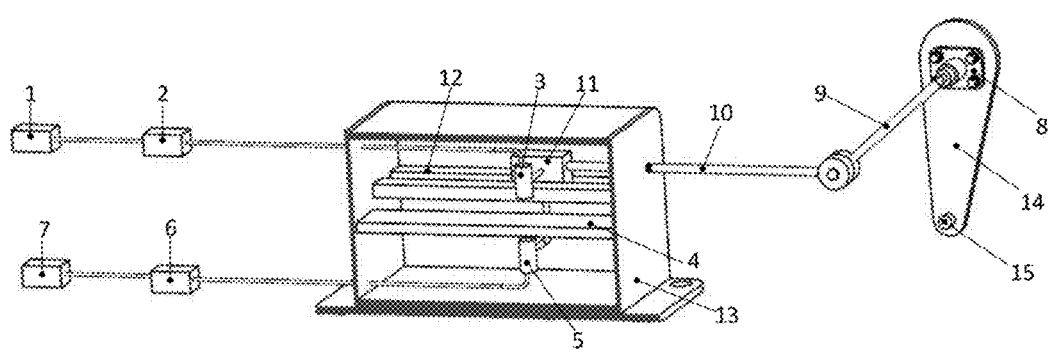
FIG. 1 is a schematic diagram of a principle and whole of the present invention.
Figure 2:
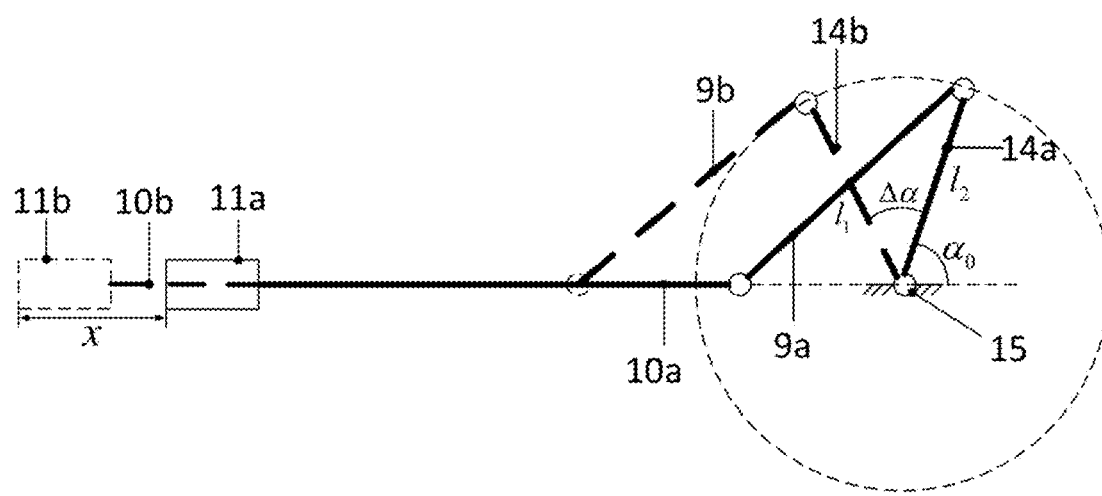
FIG. 2 is a diagram of a motion principle of a mechanical part.

An embodiment of the present invention provides a device for detecting an angle of a shearer rocker arm based on optical fiber sensing, which, as shown in FIGS. 1 and 2, includes an optical system and a mechanical system. The optical system includes a broadband light source 1, a polarizer 2, a first collimating lens 3, a gradient-rotation media plate 4, a second collimating lens 5, a polarization beam splitter 6, and a data processing module 7. The mechanical system includes a connecting base 8, a first connecting rod 9, a second connecting rod 10, a slider 11, a bracket 12, and a sensor housing 13.

The broadband light source 1 is connected to the polarizer 2 via a single-mode optical fiber, and the polarizer 2 is connected to the first collimating lens 3 via a rotary Hi-Bi PCF. The first collimating lens 3 and the second collimating lens 5 have the central axes on the same line, and both are fixed to the slider 11 via a rigid connecting rod. The slider 11 fits into the bracket 12 via a linear sliding chute on the bracket 12, and the bracket 12 is fixed inside the sensor housing 13.

The gradient-rotation media plate 4 is fixed in the sensor housing 13 and located between the first and second collimating lenses 3 and 5. The second collimating lens 5 is connected to the polarization beam splitter 6 via a rotary Hi-Bi PCF. The polarization beam splitter 6 is connected to the data processing module 7 via a single-mode optical fiber.

One end of the first connecting rod 9 is connected to the connecting base 8 via a hinge, and the first connecting rod 9 and the connecting base can be rotated with respect to each other via the hinge. The other end of the first connecting rod 9 is connected to the second connecting rod 10 via a hinge, and the first connecting rod 9 and the second connecting rod 10 can be rotated with respect to each other via the hinge. The other end of the second connecting rod 10 is fixedly connected to the slider 11, and the second connecting rod 10 is parallel to a length direction of the bracket 12.

The broadband light source 1 requires explosion-proof treatment.

The gradient-rotation media plate 4 is elongated, has a refractive index gradually varying along the length direction, and further has an optical activity. A specific rotation of the gradient-rotation media plate 4 along the length direction and a position on the length direction meet a linear relationship: α=kx, where α is a specific rotation of a certain position on the length direction of the gradient-rotation media plate 4, x is a distance from the certain position on the gradient-rotation media plate 4 to a right end, and k is a constant.

A tail fiber of the polarization beam splitter 6 is a polarization-maintaining optical fiber.

The data processing module 7 is composed of a photoelectric detector, a data processing chip, and a display device; and is used to obtain a phase angle of polarized light by calculation of optical power and display the phase angle with the display device.

The second connecting rod 10 is greater than the gradient-rotation media plate 4 in length.

The slider 11 fits into the sliding chute of the bracket 12 by means of grease lubrication.

The present invention further provides a method for detecting an angle of a shearer rocker arm based on optical fiber sensing, which includes the following steps:

A: The connecting base 8 of the device is fixedly connected to a rocker arm 14 of a shearer by using bolts, and the sensor housing 13 is fixedly connected to a machine body of the shearer by using bolts, where an eccentric distance between the hinge pin (15) and the second connecting rod (10) is ensured to be 0. The slider 11 is placed at the rightmost initial position on the sliding chute of the bracket 12.

B: The broadband light source 1 is turned on. Light output from the broadband light source 1 enters the polarizer 2 through a single-mode optical fiber to form linearly polarized light in the polarizer 2, and the linearly polarized light output from the polarizer 2 enters the first collimating lens 3 via a rotary Hi-Bi PCF. The linearly polarized light output from the first collimating lens 3 passes through the gradient-rotation media plate 4 and then reaches the second collimating lens 5, where due to an optical rotation effect, a plane of polarization of the linearly polarized light produces a rotation angle during passing through the gradient-rotation media plate. The linearly polarized light output from the second collimating lens 5 enters the polarization beam splitter 6 via a rotary Hi-Bi PCF. The polarization beam splitter 6 splits the linearly polarized light into two optical components in orthogonal directions, and inputs the optical components to the data processing module 7 via a single-mode optical fiber. The data processing module 7 analyzes an optical signal to obtain a phase angle of the linearly polarized light, where the phase angle $\varphi = \alpha d = kxd$, x being a distance from a certain position on the gradient-rotation media plate 4 to the right end, d being the thickness of the gradient-rotation media plate, and k being a constant.

C: The rocker arm of the shearer is connected to a traction case of the shearer by using a hinge pin. When the shearer operates, the rocker arm 14 of the shearer swings with the hinge pin 15 as a rotation axis to perform coal mining, and the slider 11 moves leftwards along a straight line with respect to the gradient-rotation media plate 4 during lifting and swinging of the rocker arm 14. When the rocker arm (14) of the shearer is rotated about the hinge pin (15) from a position 14a to a position 14b, a rotation angle of the rocker arm (14) in this case is Δα, and simultaneously, the first connecting rod (9) shifts from a position 9a to a position 9b and the second connecting rod (10) moves from a position 10a to a position 10b. Because the second connecting rod (10) is fixedly connected to the slider (11), the slider (11) moves from a position 11a to a position 11b. In this case, the slider (11) has a displacement of x, and the displacement x of the slider (11) and the angle Δα of swing of the rocker arm 14 meet the following relationship:

$$x = \left[ l_1 \cos \arcsin \frac{l_2 \sin(\alpha_0 - \Delta\alpha)}{l_1} - l_2 \cos(\alpha_0 - \Delta\alpha) \right] -$$
$$\left[ l_1 \cos \arcsin \frac{l_2 \sin\alpha_0}{l_1} - l_2 \cos\alpha_0 \right]$$

where x is a distance from a position of the slider 11 to the rightmost initial position on the sliding chute of the bracket 12, $l_1$ is the length of the first connecting rod 9, $l_2$ is a distance from the center of a position of the connecting base 8 on the rocker arm 14 to the hinge pin 15, $\alpha_0$ is an included angle between a direction vector of a line where a central axis of an initial position of the rocker arm 14 is located and a direction vector of a line where a length direction of the second connecting rod (10) is located, and $\Delta\alpha$ is an angle of swing of the rocker arm 14, which is positive in a clockwise swing and negative in a counterclockwise swing.

D: The first collimating lens 3 and the second collimating lens 5 move with the slider 11 in a straight line along the length direction of the second connecting rod 10, where a position on the gradient-rotation media plate 4 through which the linearly polarized light output from the first collimating lens 3 passes changes accordingly and the rotation angle of the plane of polarization of the linearly polarized light after passing through the gradient-rotation media plate also changes. Therefore, a functional relationship between the phase angles φ obtained by the data processing module 7 and corresponding to different positions of the slider 12 and the angles $\Delta\alpha$ of swing of the rocker arm 15 is as follows:

$$\varphi = kd \cdot \left\{ \left[ l_1 \cos \arcsin \frac{l_2 \sin(\alpha_0 - \Delta\alpha)}{l_1} - l_2 \cos(\alpha_0 - \Delta\alpha) \right] - \left[ l_1 \cos \arcsin \frac{l_2 \sin\alpha_0}{l_1} - l_2 \cos\alpha_0 \right] \right\}.$$

Therefore, the phase angles φ and the angles $\Delta\alpha$ of swing meet one-to-one correspondence, that is, the angle of swing of the rocker arm can be determined according to the obtained phase angle of the linearly polarized light.

The above merely describes preferred embodiments of the present invention, and is not intended to limit the present invention in any form. Based on the embodiments of the present invention, other embodiments acquired by those of ordinary skill in the art without creative effort all belong to the protection scope of the present invention. Any simple modifications and equivalent changes made to the foregoing embodiments according to the technical essence of the present invention all fall within the protection scope of the present invention.

What is claimed is:

1. A device for detecting an angle of a shearer rocker arm based on optical fiber sensing, comprising an optical system and a mechanical system, wherein the optical system comprises a broadband light source, a polarizer, a first collimating lens, a gradient-rotation media plate, a second collimating lens, a polarization beam splitter, and a data processing module; and the mechanical system comprises a connecting base, a first connecting rod, a second connecting rod, a slider, a bracket, and a sensor housing;

the broadband light source is connected to the polarizer via a single-mode optical fiber, and the polarizer is connected to the first collimating lens via a rotary high birefringence photonic crystal fiber (Hi-Bi PCF); the first collimating lens and the second collimating lens have the central axes on the same line, and both are fixed to the slider; and the slider is located on the bracket and is slidable on the bracket, and the bracket is fixed inside the sensor housing;

the gradient-rotation media plate is fixed in the sensor housing and located between the first and second collimating lenses and; the second collimating lens is connected to the polarization beam splitter via a rotary Hi-Bi PCF; and the polarization beam splitter is connected to the data processing module via a single-mode optical fiber; and one end of the first connecting rod is connected to the connecting base via a hinge, and the first connecting rod and the connecting base are rotatable with respect to each other via the hinge; the other end of the first connecting rod is connected to the second connecting rod via a hinge, and the first connecting rod and the second connecting rod are rotatable with respect to each other via the hinge; and the other end of the second connecting rod is fixedly connected to the slider, and the second connecting rod is parallel to a length direction of the bracket.

2. The device for detecting an angle of a shearer rocker arm based on optical fiber sensing according to claim 1, wherein the slider is connected to the bracket via a linear sliding chute on the bracket.

3. The device for detecting an angle of a shearer rocker arm based on optical fiber sensing according to claim 1, wherein the broadband light source requires explosion-proof treatment.

4. The device for detecting an angle of a shearer rocker arm based on optical fiber sensing according to claim 1, wherein the gradient-rotation media plate has a refractive index gradually varying along the length direction, and further has an optical activity; and a specific rotation of the gradient-rotation media plate along the length direction and a position on the length direction meet a linear relationship: α=kx, wherein α is a specific rotation of a certain position on the gradient-rotation media plate in the length direction, x is a distance from the certain position on the gradient-rotation media plate to a right end, and k is a constant.

5. The device for detecting an angle of a shearer rocker arm based on optical fiber sensing according to claim 1, wherein a tail fiber of the polarization beam splitter is a polarization-maintaining optical fiber.

6. The device for detecting an angle of a shearer rocker arm based on optical fiber sensing according to claim 1, wherein the data processing module is composed of a photoelectric detector, a data processing chip, and a display device; and is used to obtain a phase angle of polarized light by calculation of optical power and display the phase angle with the display device.

7. The device for detecting an angle of a shearer rocker arm based on optical fiber sensing according to claim 1, wherein the second connecting rod is greater than the gradient-rotation media plate in length.

8. The device for detecting an angle of a shearer rocker arm based on optical fiber sensing according to claim 2, wherein the slider fits into the sliding chute of the bracket by means of grease lubrication.

9. A method for detecting an angle of a shearer rocker arm based on optical fiber sensing implemented by using the device according to claim 1, comprising the following steps:

A: fixedly connecting the connecting base of the device to a rocker arm of a shearer by using bolts; fixedly connecting the sensor housing to a machine body of the shearer by using bolts, wherein an eccentric distance between the hinge pin and the second connecting rod is ensured to be 0; and placing the slider at the rightmost initial position on the sliding chute of the bracket;

B: light output from the broadband light source entering the polarizer through a single-mode optical fiber to form linearly polarized light in the polarizer, and the linearly polarized light output from the polarizer entering the first collimating lens via a rotary Hi-Bi PCF; the linearly polarized light output from the first collimating lens passing through the gradient-rotation media plate and then reaching the second collimating lens, wherein a plane of polarization of the linearly polarized light produces a rotation angle during passing through the gradient-rotation media plate; the linearly polarized light output from the second collimating lens entering the polarization beam splitter via a rotary Hi-Bi PCF; splitting, by the polarization beam splitter, the linearly polarized light into two optical components in orthogonal directions, and inputting the optical components to the data processing module via a single-mode optical fiber; and analyzing, by the data processing module, an optical signal to obtain a phase angle of the linearly polarized light, wherein the phase angle $\varphi = \alpha d = kxd$, x being a distance from a certain position on the gradient-rotation media plate to the right end, d being the thickness of the gradient-rotation media plate, and k being a constant;

C: connecting the rocker arm of the shearer to a traction case of the shearer by using a hinge pin; when the shearer operates, the rocker arm of the shearer swinging with the hinge pin as a rotation axis to perform coal mining, and the slider moving leftwards along a straight line with respect to the gradient-rotation media plate during lifting and swinging of the rocker arm; and setting a rotation angle of the rocker arm of the shearer to $\Delta\alpha$, wherein in this case, the slider has a displacement of x, and the displacement x of the slider and the angle $\Delta\alpha$ of swing of the rocker arm meet the following relationship:

$$x = \left[ l_1 \cos \arcsin \frac{l_2 \sin(\alpha_0 - \Delta\alpha)}{l_1} - l_2 \cos(\alpha_0 - \Delta\alpha) \right] -$$

-continued
$$\left[ l_1 \cos \arcsin \frac{l_2 \sin \alpha_0}{l_1} - l_2 \cos \alpha_0 \right]$$

wherein x is a distance from a position of the slider (11) to the rightmost initial position on the sliding chute of the bracket, $l_1$ is the length of the first connecting rod, $l_2$ is a distance from the center of a position of the connecting base on the rocker arm to the hinge pin, $\alpha_0$ is an included angle between a direction vector of a line where a central axis of an initial position of the rocker arm is located and a direction vector of a line where a length direction of the second connecting rod is located, and $\Delta\alpha$ is an angle of swing of the rocker arm, which is positive in a clockwise swing and negative in a counterclockwise swing; and D: the first collimating lens and the second collimating lens moving with the slider in a straight line along the length direction of the second connecting rod, wherein a position on the gradient-rotation media plate through which the linearly polarized light output from the first collimating lens passes changes accordingly and the rotation angle of the plane of polarization of the linearly polarized light after passing through the gradient-rotation media plate also changes; a functional relationship between the phase angles $\varphi$ obtained by the data processing module and corresponding to different positions of the slider and the angles $\Delta\alpha$ of swing of the rocker arm is as follows:

$$\varphi = kd \cdot \left\{ \left[ l_1 \cos \arcsin \frac{l_2 \sin(\alpha_0 - \Delta\alpha)}{l_1} - l_2 \cos(\alpha_0 - \Delta\alpha) \right] - \left[ l_1 \cos \arcsin \frac{l_2 \sin \alpha_0}{l_1} - l_2 \cos \alpha_0 \right] \right\};$$

and therefore, the phase angles $\varphi$ and the angles $\Delta\alpha$ of swing meet one-to-one correspondence, that is, the angle of swing of the rocker arm is able to be determined according to the obtained phase angle of the linearly polarized light.

* * * * *